(12) United States Patent
Wolff et al.

(10) Patent No.: US 11,930,732 B2
(45) Date of Patent: *Mar. 19, 2024

(54) APPARATUS AND METHOD FOR PERFORMING TASKS ON A PATTERN PLANTED FIELD

(71) Applicant: Deere & Company, Moline, IL (US)

(72) Inventors: Kilian Wolff, Mandelbachtal (DE); Roland Werner, Edingen-Neckarhausen (DE); Richard A. Humpal, Ankeny, IA (US); Wolfram Haiges, Magstadt (DE)

(*) Notice: Subject to any disclaimer, the term of this patent is extended or adjusted under 35 U.S.C. 154(b) by 277 days.

This patent is subject to a terminal disclaimer.

(21) Appl. No.: 17/379,735

(22) Filed: Jul. 19, 2021

(65) Prior Publication Data

US 2021/0345540 A1 Nov. 11, 2021

Related U.S. Application Data

(62) Division of application No. 15/990,477, filed on May 25, 2018, now Pat. No. 11,083,130.

(51) Int. Cl.
*A01C 21/00* (2006.01)
*A01B 39/20* (2006.01)
(Continued)

(52) U.S. Cl.
CPC ............ *A01C 21/005* (2013.01); *A01B 39/20* (2013.01); *A01C 7/08* (2013.01); *A01G 25/09* (2013.01);
(Continued)

(58) Field of Classification Search
CPC ......... A01C 21/005; A01C 7/08; A01C 21/00; A01B 39/20; A01B 39/00; A01G 25/09;
(Continued)

(56) References Cited

U.S. PATENT DOCUMENTS 6,199,000 B1 3/2001 Keller et al.
6,941,225 B2 9/2005 Upadhyaya et al.
(Continued)

FOREIGN PATENT DOCUMENTS

DE 4135414 4/1993
DE 102005010686 10/2005
(Continued)

OTHER PUBLICATIONS

Pawlow, "The Mechanization of Rectangular Grid Sowing of Maize," Agratechnik, 9th Ed., Mar. 1959, pp. 101-104, 9 pages. (Machine translation included).
(Continued)

*Primary Examiner* — Christopher J. Novosad
(74) *Attorney, Agent, or Firm* — Hanley, Flight & Zimmerman, LLC

(57) ABSTRACT

An agricultural machine system for performing agricultural tasks in a field on which plants are planted or will be planted in a pattern, the system comprising: a prime mover; a tool bar connected to the prime mover; a plurality of units attached to the tool bar, the units configured to perform at least one agricultural tasks and wherein at least two of the units are disposed in an offset relationship from each other with respect to a forward direction of travel of the agricultural machine about the tool bar; and a control unit in communication with the prime mover and the plurality of units, the control unit configured to determine a selective location corresponding to the pattern in which plants are planted or will be planted and activate the units at the selective location to perform the at least one agricultural task as the agricultural machine system travels along a plurality of rows.

20 Claims, 2 Drawing Sheets

(51) Int. Cl.
| | |
|---|---|
| *A01C 7/08* | (2006.01) |
| *A01G 25/09* | (2006.01) |
| *A01G 25/16* | (2006.01) |
| *A01M 7/00* | (2006.01) |
| *A01M 21/00* | (2006.01) |
| *B05B 13/00* | (2006.01) |

(52) U.S. Cl.
CPC ............ *A01G 25/16* (2013.01); *B05B 13/005* (2013.01); *A01M 7/0071* (2013.01); *A01M 21/00* (2013.01)

(58) Field of Classification Search
CPC ..... A01G 25/16; A01G 25/00; A01M 7/0071; A01M 7/005; A01M 7/00; A01M 21/00; B05B 13/005; B05B 13/00
See application file for complete search history.

(56) References Cited

U.S. PATENT DOCUMENTS

| | | | |
|---|---|---|---|
| 9,743,576 | B2 | 8/2017 | Gadzella et al. |
| 9,861,032 | B2 | 1/2018 | Wood |
| 9,872,433 | B2 * | 1/2018 | Acheson ............... A01D 41/127 |
| 11,083,130 | B2 | 8/2021 | Wolff et al. |
| 2014/0277959 | A1 | 9/2014 | Wagers et al. |
| 2014/0379228 | A1 | 12/2014 | Batcheller et al. |
| 2019/0357426 | A1 | 11/2019 | Wolff et al. |

FOREIGN PATENT DOCUMENTS

| | | | |
|---|---|---|---|
| EP | 0845198 | 6/1998 | |
| EP | 0970595 | 1/2000 | |
| FR | 696614 | 1/1931 | |
| FR | 2696614 A1 * | 4/1994 | ............ A01B 49/06 |
| JP | 2017189134 A * | 10/2017 | ............ A01C 15/00 |
| WO | 2017184637 | 10/2017 | |

OTHER PUBLICATIONS

Karakowa, "Machines for Maize Cultivation," Agrartechnik, Issue 3, Mar. 1959, pp. 108-109, 5 pages. (Machine translation included).

European Patent Office, "Extended European Search Report," issued in connection with European Patent Application No. 19176213.7, dated Oct. 14, 2019, 9 pages.

European Patent Office, "Communication pursuant to Article 94(3) EPC," issued in connection with European Patent Application No. 19176213.7, dated Jul. 22, 2020, 5 pages.

European Patent Office, "Communication under Rule 71(3) EPC," issued in connection with European Patent Application No. 19176213.7, dated Nov. 23, 2020, 5 pages.

United States Patent and Trademark Office, "Requirement for Restriction," issued in connection with U.S. Appl. No. 15/990,477, dated Aug. 24, 2020, 6 pages.

United States Patent and Trademark Office, "Non-Final Office Action," issued in connection with U.S. Appl. No. 15/990,477, dated Dec. 8, 2020, 14 pages.

United States Patent and Trademark Office, "Notice of Allowance and Fee(s) Due," issued in connection with U.S. Appl. No. 15/990,477, dated Apr. 7, 2021, 11 pages.

* cited by examiner

APPARATUS AND METHOD FOR PERFORMING TASKS ON A PATTERN PLANTED FIELD

RELATED APPLICATION

This patent arises from a divisional of U.S. patent application Ser. No. 15/990,477, entitled "Apparatus and Method for Performing Tasks on a Pattern Planted Field" and filed on May 25, 2018. U.S. patent application Ser. No. 15/990,477 is hereby incorporated herein in its entirety. Priority to U.S. patent application Ser. No. 15/990,477 is claimed.

TECHNICAL FIELD

The present disclosure generally relates to an agricultural vehicle for performing tasks on a field on which plants are planted or will be planted in a pattern.

BACKGROUND

In agriculture, plants that are planted at greater distances from each other such as maize or beets are usually sown by precision seeders. In this case a tractor moves a plurality of row units mounted on a tool bar over a field and the row units are controlled so that the seeds are deposited at spacings that are as regular as possible. This procedure has the effect that all row units of the machine are to be activated at the same time at least when traveling in one direction of the planting pattern (and in both directions in the case of rectangular planting patterns). In the case of diamond-shaped planting patterns, half of the units would still need to be activated at the same time.

An electromagnetic actuation of a plurality of row units on a planter, the nozzles on a sprayer or ground engaging tools of a cultivator has the result that a sudden high load on the power supply arises. For example, in the case of a local, site-specifically controlled output of liquid (water, spray agent, liquid fertilizer) or solid substances (for example, fertilizer granules), the simultaneous activation of a plurality of nozzles causes undesirable pressure variations in the supply system, and a simultaneous activation of mechanical units like cultivators for weeding can result in oscillations of the frame carrying the units in the lateral or forward direction. In another example, the units of the planting or seeding machine need to be controlled completely or at least partly at the same time during the introduction of the plants or the seed, which likewise can lead to undesired load peaks in the drive.

SUMMARY

Various aspects of the present disclosure are set out in the claims.

According to a first aspect of the present disclosure, an agricultural machine system is provided for performing agricultural tasks in a field on which plants are planted or will be planted in a pattern, the system comprising: a prime mover; a tool bar connected to the prime mover; a plurality of units attached to the tool bar, the units configured to perform at least one agricultural task and wherein at least two of the units are disposed in an adjustable offset relationship from each other with respect to a forward direction of travel of the agricultural machine about the tool bar; and a control unit in communication with the prime mover and the plurality of units, the control unit configured to determine a selective location corresponding to the pattern in which plants are planted or will be planted and activate the units at the selective location to perform the at least one agricultural task as the agricultural machine system travels along a plurality of rows.

According to a second aspect of the present disclosure, a method for performing agricultural tasks in a field on which plants are planted or will be planted in a pattern is provided, the method comprising: providing a machine with units disposed at an offset from each other with respect to a forward direction of travel of the machine, the units configured to perform the tasks in a forward direction along the plant rows defined by the planting pattern; providing a control unit in communication with the machine and the units; determining, with the control unit, a selective location corresponding to the pattern in which plants are planted or will be planted; and activating, with the control unit, the units at the selective location to perform the at least one agricultural task as the agricultural machine system travels along a plurality of rows.

DESCRIPTION OF THE DRAWINGS

The detailed description of the drawings refers to the accompanying figures in which.

DETAILED DESCRIPTION

Figure 2:
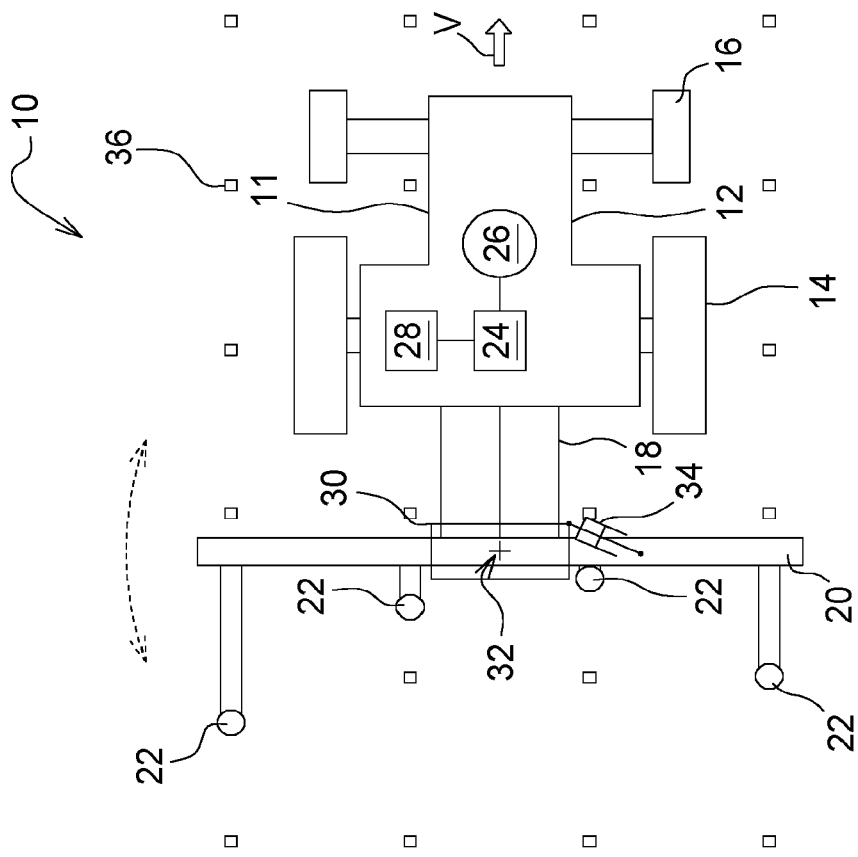
FIG. 2 shows a top view of a first embodiment of a machine for performing tasks on plants planted in a planting pattern on a field.

In order to allow travel over the field for certain post-planting tasks (e.g., fertilizing, pest and weed control), it has been proposed to control the planter row units automatically so that the seed is deposited at predetermined locations, and thus a regular pattern of plants arises over the entire field (or a part thereof), which enables travel in two different directions, which are at an angle to each other (P. Pawlow, "The Mechanization of Rectangular Grid Sowing of Maize," Agrartechnik, March 1959, pp. 101-104, N. Karakowa, "Machines for Maize Cultivation," Agrartechnik, March 1959, pp. 108-109, and German Patent Application No. DE 10 2005 010 686 A1). In this way the moisture and nutrient uptake of the plants is improved and it becomes possible to remove weeds standing between the plant rows by covering both directions in succession with a cultivator. The sowing operation can be controlled using a satellite-based position determining system, where, depending on the angle between the two directions, the individual seeding units become activated at the same time (in the case of a rectangular planting pattern) or staggered in time (in the case of a diamond-shaped planting pattern with non-orthogonal directions).

It was also proposed to control the activation of seeding units by a preset map defining a planting pattern (U.S. Pat. No. 6,941,225). Certain post-planting tasks like application of pesticides directly onto the plants, cultivating, irrigating, and fertilizing take place via machines that are guided manually or automatically along one or more directions defined by the planting pattern. Such machines usually each carry a plurality of units for performing the tasks, each of which is assigned a plant row or a space remaining between adjacent plant rows. The units are automatically controlled on the basis of the known position of the individual plants. Cultivating and spraying with operating elements offset in the forward direction have already been described (N. Karakowa, et al., German Patent Application No. DE 41 35 414 A1 and WO 2017/184 637 A1) with the operation or the liquid output taking place continuously.

In one possible embodiment, a control unit is connected to a memory 28, in which a map of the locations regarding the position on which plants have already been planted or seeded or are to be planted or seeded in a subsequent step is stored. The memory 28 provides a non-transitory computer readable storage medium that stores operational instructions that are executed by a processing module of the control unit 24.

The memory 28 may include a single memory device or a plurality of memory devices. Each memory device is associated with a memory type including one or more of a read-only memory, random access memory, volatile memory, non-volatile memory, cache memory, and/or any device that stores digital information. Each memory device may be implemented utilizing one or more technologies including static random access memory (SRAM), dynamic random access memory (DRAM), NAND flash memory, magnetic memory (e.g., a hard disk), and optical memory (e.g., an optical disc) that stores digital information. The memory device may be removable (e.g., a universal serial bus flash drive) to facilitate transfer of data between the computing unit 26 and other entities that may operably couple with the removable memory device.

Further, with respect to this possible embodiment, the control unit 24 is in communication with a position determining device and is configured to activate the units 22 at predetermined positions using the signals of the position determining device and the map. Alternatively or additionally, the positions at which the units 22 are to be activated can be detected using a sensor associated with at least one row unit (for example a camera).

The offset, in the forward direction, of the units 22 that are to be activated successively in time can correspond at least approximately to the spacing of the plants—which could can be an actual or intended plant spacing—in the forward direction of the machine divided by the number of units of the machine. Because of this, the activation of all units is evenly divided over the time that the machine needs to travel in the forward direction from one plant to the next plant.

The offset of the units of the machine with respect to each other can be achieved by mounting the units on a transverse tool bar, but with different spacings from the tool bar in the forward direction, and/or by using a plurality of tool bars (carrying one or more units offset or not offset in the forward direction), which are mounted offset in the forward direction. Additionally or alternatively, the tool bar can be oriented not perpendicular to the forward direction, but rather at an angle rotated about a first axis, e.g., a vertical axis, which accordingly extends at an angle to the transverse direction. The said orientation can be achieved by rotating the tool bar about the first axis by a fixed or variable angle with respect to a chassis carrying the tool bar, which is pulled by a towing vehicle, or with respect to the chassis of a self-powered vehicle. In the case of a self-propelled vehicle with steerable wheels offset in the forward direction, there is also the possibility of having it travel in a crab steering mode in order to achieve the said angle. It can be appreciated by one of ordinary skill that in addition to rotation about a first axis, the tool bar could also be rotated about one or more additional axes in one more planes, e.g. a vertical plane, horizontal plane or some combination thereof.

Since the spacing of successive plants—which again could be an actual or intended plant spacing—in the forward direction of the machine is not necessarily constant, the offset of the units can be adjustably manually or with an actuator associated with at least one of the units. For this, the units can be mounted on a tool bar, the angle of which can be varied about the vertical axis for adjusting the offset of the units. The tool bar can be mounted on a bracket, which is connected to a vehicle carrying or towing the bracket, and the angle between the bracket and the tool bar can be varied about the vertical axis. It would also be possible for the tool bar to be mounted on a steerable chassis and the angle between the chassis and a vehicle towing it to be variable.

Preferably, the units are irregularly offset over the width of the machine with respect to the forward direction. Accordingly, adjacent units are not immediately activated one after the other, but rather units that are spaced farther apart are so activated. This procedure has the advantage that undesirable mechanical oscillations are avoided, and pressure variations in the liquid supply are avoided in the case of units applying liquids.

The units can be configured to apply liquid (for example, water, spray agents, liquid fertilizers), solids (for example, plants, seeds, fertilizers), and/or for mechanical working of the field (for example, as cultivators for weeding), or the plants (for example, for cutting). Thus, for example, first fertilizer and then seed can be applied to the locations preset by the planting pattern with a single machine in a single pass, or two different machines following one another are used for this. As mentioned, the units can work on the field before the plants have been seeded or planted into the ground, for example to provide fertilizer supplies in the ground.

Figure 1:
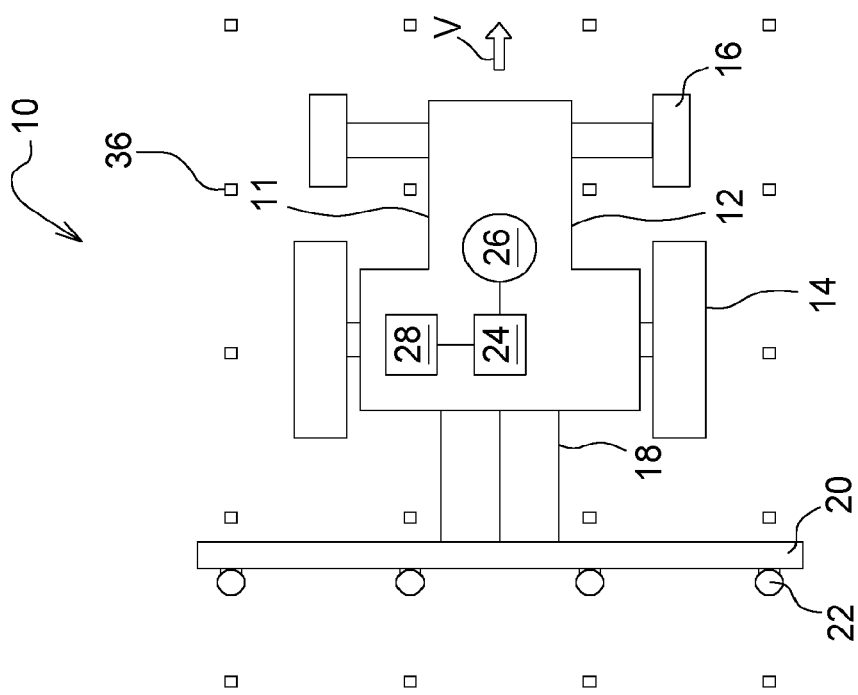
FIG. 1 shows a top view of a machine for performing tasks on plants planted in a planting pattern on a field, as is known from the prior art.

FIG. 1 shows a top view of a machine 10 for performing tasks (in particular cultivation measures or sowing operations) on plants planted in a planting pattern on a field according to the prior art. The machine comprises a vehicle 11 in the form of a tractor with a chassis 12, which is supported on the ground on driven rear wheels 14 and steerable front wheels 16 and can be moved over the soil of a field in a forward direction V, which goes from left to right in FIG. 1, by substantially known drive system (e.g., drive engine, transmission).

A tool bar 20, which carries a number (n, four in this example) of units 22, which serve to perform tasks on plants 36, is mounted on a three-point hitch 18, which has an upper arm and two lower arms. The units 22 can supply the plants with nutrients (fertilizer), water, pesticides, etc., or can control weeds growing between the plants 36 mechanically or using a spray agent.

The plants 36 are planted or planned to be planted in a rectangular planting pattern, which could also be diamond-shaped. The machine 10 accordingly can travel over the field in a first direction, as shown in FIG. 1, or a second direction, which runs transverse to it. In the case of a diamond-shaped planting pattern, the second direction would not be orthogonal to the first direction, but rather would be oriented at an angle of about 60° to it.

The machine 10 comprises a control unit 24, which is connected to a memory 28 and a position determining device 26 and serves to activate the units 22 when a plant 36 and/or an intermediate space between plants 36 in the forward direction V or transverse thereto is to be treated, and then to deactivate them again. For this, the position determining device 26 receives signals from satellites of a satellite-based position determining system (for example, GPS, Galileo, and/or Glonass) and possibly local or global correction signals, in order to determine its actual position, which the control unit 24 converts to the positions of the units 22 (see generally European Patent Application No. EP 0 970 595 A1 and European Patent Application No. EP 0 845 198 A1).

An electronic map stored in the memory 28 can be used by the control unit 24 to calculate the actual or intended positions of the individual plants 36 is stored in the memory 28. The map can, for example, contain the locations of all the plants to be treated in two- or three-dimensional coordinates or relative data on the spacing of adjacent plants in two directions, the alignment of the plants 36, and a reference location. The map can have been stored during the sowing or planting of the plants 36 as a target or actual value map and transmitted to the memory 28. The units 22 are then always activated by the control device 24 when they have reached a position at which tasks are to be carried out. Alternatively or additionally, it would also be possible to equip the individual units 22 with sensors (not shown) that detect when the units 22 are to be activated. Such sensors could be, for example, cameras with image processing systems for recognition of plants and/or weeds growing between them.

Steering of the vehicle 11 along the plant rows can take place automatically using the position determining device 26 and a steering control of the vehicle 11 or manually by an operator of the vehicle 11. The same applies to the drive speed of the vehicle 11.

Since the planting pattern in FIG. 1 is square or rectangular, all units 22 of the machine 10 always reach the plants 36 that are to be treated at the same time. Thus, all units 22 are also to be activated at least approximately at the same time. This has the result that a very high current demand occurs when the valves of units 22 that apply liquid are switched on or when units 22 are mechanically activated by electromagnets, which highly stresses or even overloads the electrical power supply of the machine 10. The same is true for the liquid supply of the units applying liquid, which becomes suddenly highly stressed or overloaded. Moreover, undesirable pressure variations and oscillations can arise in the liquid supply. In the case of mechanically actuated units 22, mechanical oscillations can arise in the tool bar 20, either in the transverse direction or forward direction V.

FIG. 2 shows a first embodiment of the invention, in which the said disadvantages are avoided or at least reduced, in that the units 22 are offset relative to each other in the forward direction V. The unit 22 at the top, which is disposed farthest to the right, is disposed farthest to the rear, while the unit 22 that is designated as the third unit from the top is disposed farthest forward. The unit 22 at the bottom, which is disposed farthest to the left, and the unit 22 that is the second unit from the top lie between them, but also are offset with respect to each other. The offset of units 22 that follow one another in the forward direction V is in each case the same and corresponds to the spacing of adjacent plants 36 in the forward direction V divided by the number n of the units 22. In this way the units 22 are each activated in a staggered way with equal time spacings. The non-regular distribution of the offset of the units 22 over the width of the machine 10, which leads to adjacent units 22 not being activated timewise immediately one after the other has the advantage that otherwise possible undesirable mechanical oscillations and possibly hydraulic oscillations are avoided or reduced.

Since the spacing of adjacent plants 36 in the forward direction is not necessarily always the same, but rather can be differently selected by the farmer during sowing or planting in dependence on site conditions, etc., in the embodiment according to FIG. 2 an adjustment assembly for changing the offset of the units 22 in the forward direction V is provided. The assembly comprises a bracket 30 attached to the vehicle 11 via a three-point hitch 18, on which the tool bar 20 can be pivoted about a vertical axis 32 and which is adjustable using the actuator 34. Through the actuator 34, the control device 24 can thus change the angle of the tool bar 20 about the vertical axis 32, either by manual entry by an operator into an operator interface or automatically according to the map stored in memory 28, in which, among other things, the spacings of the plants 36 in the forward direction are stored. The offset of the units 22 in the forward direction V also changes with the angle of the tool bar 20 about the vertical axis 32. To a certain extent the lateral offset of the units 22 also changes in this case, but this is harmless if they can also treat the plants from a certain distance, as is the case with units 22 that apply liquids. Otherwise, an alternative adjustment assembly may be provided to offset the units 22 in the transverse direction by hand or with at least one actuator. In another embodiment, three units 22 could also be assigned their own actuators or manually actuatable adjustment elements, which enable the position of the units 22 to be adjusted only in the forward direction V.

Figure 3:
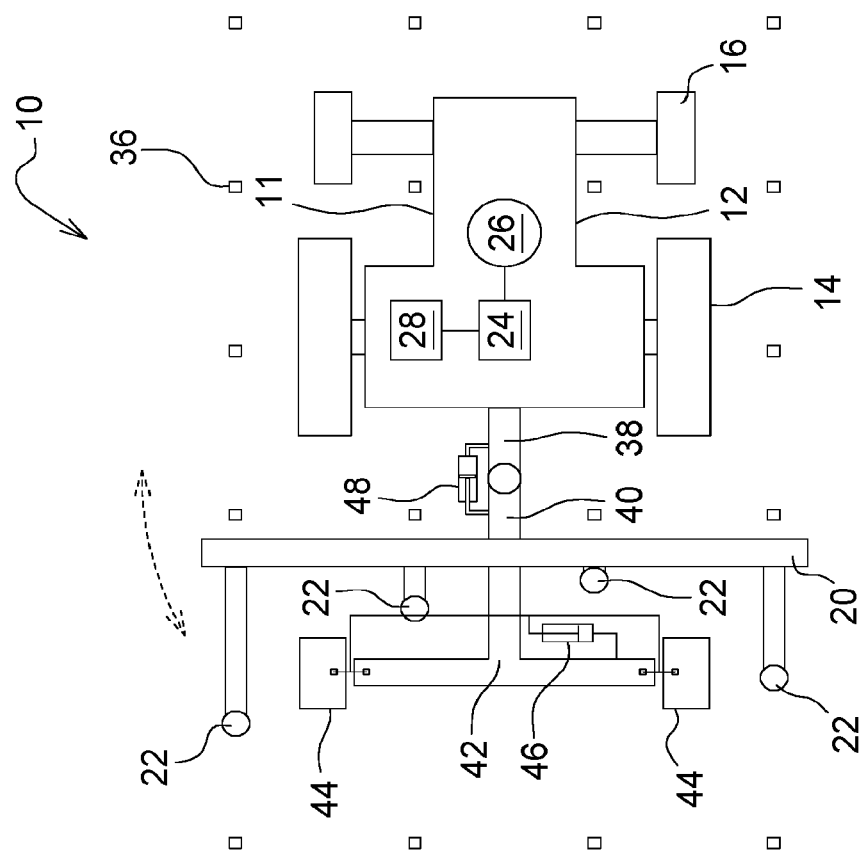
FIG. 3 shows a top view of a second embodiment of a machine for performing tasks on plants planted in a planting pattern on a field.

In the second embodiment of the invention according to FIG. 3, the tool bar 20 is not attached to a three-point hitch 18, but rather to a separate chassis 42, which is connected to a towing hitch 38 of the vehicle 11 via a drawbar 40. The angle of the drawbar 40 with respect to the vehicle 11 is variable via a (first) actuator 48, while the wheels 44 of the chassis 42 are steerable by an additional (second) actuator 46. The actuators 46 and 48 thus allow the angle of the chassis 42 and thus the tool bar 20 to vary about the vertical axis with respect to the vehicle 11 and the forward direction V, in which regard one should refer to the above statements regarding the second embodiment.

In the embodiments according to FIGS. 2 and 3, all four units 22 are offset from each other in the forward direction V. If there is a larger number of units 22, it would also be conceivable to mount some of the units 22, for example, pairwise on both sides of the tool bar 20 on both sides of the lengthwise plane of the machine 10 in like positions with respect to the forward direction V, i.e., to mount the units 22 symmetrically with respect to the lengthwise plane of the machine 10. Accordingly, not all of the units 22 have to be offset with respect to each other, but rather it is sufficient if some of the units 22 are offset with respect to each other in the forward direction V.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The invention claimed is:

1. A method for performing agricultural tasks in a field on which plants are planted or will be planted in a pattern, the method comprising:
providing a machine with first, second, and third units, the first, second, and third units disposed at a multiple of an adjustable offset from each other in a forward direction of travel of the machine, the units disposed so that an end of the first unit is a first distance from a tool bar of the machine, an end of the second unit is a second distance from the tool bar, and an end of the third unit is a third distance from the tool bar, wherein the first, second, and third distances differ from each other;

providing a control unit in communication with the machine and the first, second, and third units;

determining, with the control unit, a selective location corresponding to the pattern; and activating, with the control unit, the first, second, and third units at the selective location to perform the agricultural tasks as the machine travels along plant rows defined by the pattern, wherein the first, second, and third units are activated in the forward direction of travel along the plant rows.

2. The method of claim 1, further including determining, with the control unit, the selective location using a signal from a position determining device associated with the machine and a planting map having a location at which plants are planted or will be planted.

3. The method of claim 2, further including storing the planting map in a memory connected to the control unit.

4. The method of claim 1, further including adjusting, with the control unit, the adjustable offset in response to the determining of the selective location.

5. The method of claim 1, further including adjusting, with the control unit, the adjustable offset using at least one actuator associated with the tool bar of the machine.

6. The method of claim 5, further including adjusting, with the control unit, a position of the tool bar about a first axis of the tool bar to adjust the adjustable offset, the first axis transverse to the forward direction of travel of the machine.

7. The method of claim 1, further including activating, with the control unit, the first, second, and third units at the selective location based on signals from sensors operatively coupled to the first, second, and third units.

8. The method of claim 7, wherein the sensors are cameras, further including determining, with the control unit, the selective location based on images captured by the cameras.

9. The method of claim 1, further including causing, with the control unit, the first, second, and third units to apply at least one of fertilizer, water, granular material, seed, or mechanical treatment to the plant rows.

10. An apparatus including:
   memory;
   instructions; and
   a processor to execute the instructions to at least:
   determine a selective location corresponding to a pattern in which plants are planted or will be planted in a field; and
   activate first, second, and third control units at the selective location, the first, second, and third units to perform agricultural tasks as a machine travels along plant rows, the first, second, and third control units disposed at a multiple of an adjustable offset from each other on the machine in a forward direction of travel of the machine, the units disposed so that an end of the first unit is a first distance from a tool bar of the machine, an end of the second unit is a second distance from the tool bar, and an end of the third unit is a third distance from the tool bar, wherein the first, second, and third distances differ from each other.

11. The apparatus of claim 10, wherein the processor is to execute the instructions to determine the selective location using a signal from a position determining device associated with the machine and a planting map having a location at which the plants are planted or will be planted.

12. The apparatus of claim 11, wherein the processor is to execute the instructions to store the planting map in the memory.

13. The apparatus of claim 10, wherein the processor is to execute the instructions to adjust the adjustable offset in response to determining the selective location.

14. The apparatus of claim 10, wherein the processor is to execute the instructions to adjust the adjustable offset using at least one actuator associated with the tool bar of the machine.

15. The apparatus of claim 14, wherein the processor is to execute the instructions to adjust a position of the tool bar about a first axis of the tool bar to adjust the adjustable offset, the first axis transverse to the forward direction of travel of the machine.

16. The apparatus of claim 10, wherein the processor is to execute the instructions to activate the first, second, and third units at the selective location based on signals from sensors operatively coupled to the first, second, and third units.

17. The apparatus of claim 16, wherein the sensors are cameras, and wherein the processor is to execute the instructions to determine the selective location based on images captured by the cameras.

18. The apparatus of claim 10, wherein the processor is to execute the instructions to cause the first, second, and third units to apply at least one of fertilizer, water, granular material, seed, or mechanical treatment to the plant rows.

19. A non-transitory computer readable medium comprising instructions that, when executed, cause a processor to at least:
   determine a selective location corresponding to a pattern in which plants are planted or will be planted in a field; and
   activate first, second, and third control units of a machine at the selective location, the first, second, and third units to perform agricultural tasks as a machine travels along plant rows, the first, second, and third control units disposed at a multiple of an adjustable offset from each other in a forward direction of travel of the machine, the units disposed so that an end of the first unit is a first distance from a tool bar of the machine, an end of the second unit is a second distance from the tool bar, and an end of the third unit is a third distance from the tool bar, wherein the first, second, and third distances differ from each other.

20. The non-transitory computer readable medium of claim 19, wherein the instructions, when executed, cause the processor to determine the selective location using a signal from a position determining device associated with the machine and a planting map having a location at which the plants are planted or will be planted.

* * * * *

UNITED STATES PATENT AND TRADEMARK OFFICE
CERTIFICATE OF CORRECTION

| | |
|---|---|
| PATENT NO. | : 11,930,732 B2 |
| APPLICATION NO. | : 17/379735 |
| DATED | : March 19, 2024 |
| INVENTOR(S) | : Wolff et al. |

It is certified that error appears in the above-identified patent and that said Letters Patent is hereby corrected as shown below:

On the Title Page

Item (73), under "Assignee", insert -- Deere & Company, Moline, IL (US) --.

Signed and Sealed this
Twenty-first Day of May, 2024

Katherine Kelly Vidal
*Director of the United States Patent and Trademark Office*